(12) United States Patent
Kwiecinski et al.

(10) Patent No.: US 7,798,570 B2
(45) Date of Patent: Sep. 21, 2010

(54) ADJUSTABLE HEADREST FOR A VEHICLE SEAT

(75) Inventors: Jozef Kwiecinski, Macomb, MI (US); Mark L. Cutshall, Livonia, MI (US)

(73) Assignee: E & E Manufacturing Company, Inc., Plymouth, MI (US)

( * ) Notice: Subject to any disclaimer, the term of this patent is extended or adjusted under 35 U.S.C. 154(b) by 17 days.

(21) Appl. No.: 12/165,915

(22) Filed: Jul. 1, 2008

(65) Prior Publication Data
US 2009/0008972 A1 Jan. 8, 2009

Related U.S. Application Data (60) Provisional application No. 60/958,371, filed on Jul. 5, 2007.

(51) Int. Cl.
*B60N 2/42* (2006.01)
(52) U.S. Cl. .................. 297/216.12; 297/408; 297/391; 297/410; 297/409
(58) Field of Classification Search ............ 297/216.12, 297/408, 391, 410, 409
See application file for complete search history.

(56) References Cited

U.S. PATENT DOCUMENTS

| | | | | |
|---|---|---|---|---|
| 2,920,848 | A * | 1/1960 | Bohlin | 244/122 AG |
| 3,802,737 | A * | 4/1974 | Mertens | 297/216.2 |
| 3,838,870 | A * | 10/1974 | Hug | 297/472 |
| 4,515,406 | A * | 5/1985 | Fujiyama et al. | 297/409 |
| 4,647,108 | A * | 3/1987 | Hayashi | 297/391 |
| 4,720,146 | A | 1/1988 | Mawbey et al. | |
| 4,848,838 | A * | 7/1989 | McCrackin et al. | 297/391 |
| 5,056,816 | A * | 10/1991 | Lutze et al. | 280/751 |
| 5,934,750 | A | 8/1999 | Fohl | |
| 6,088,640 | A | 7/2000 | Breed | |
| 6,213,548 | B1 | 4/2001 | Van Wynsberghe et al. | |
| 6,352,285 | B1 * | 3/2002 | Schulte et al. | 280/756 |
| 6,478,373 | B1 | 11/2002 | Hake et al. | |
| 6,607,242 | B2 * | 8/2003 | Estrada et al. | 297/216.12 |
| 6,688,697 | B2 | 2/2004 | Baumann et al. | |
| 6,715,829 | B2 | 4/2004 | Svantesson et al. | |
| 6,805,411 | B2 * | 10/2004 | Gramss et al. | 297/408 |
| 7,070,235 | B2 | 7/2006 | Schilling et al. | |
| 7,111,901 | B2 * | 9/2006 | Schlierf et al. | 297/216.12 |
| 7,517,015 | B2 * | 4/2009 | Terada et al. | 297/216.12 |
| 7,585,023 | B2 * | 9/2009 | Tang et al. | 297/216.12 |
| 2002/0093231 | A1 * | 7/2002 | Estrada et al. | 297/216.12 |
| 2003/0030309 | A1 * | 2/2003 | Pal et al. | 297/216.12 |
| 2004/0256894 | A1 * | 12/2004 | McManus et al. | 297/93 |
| 2005/0077762 | A1 | 4/2005 | Kraemer et al. | |
| 2006/0279114 | A1 | 12/2006 | Toda et al. | |

OTHER PUBLICATIONS

International Search Report for PCT/US2008/069159 dated Oct. 2, 2008.

* cited by examiner

*Primary Examiner*—Laurie K Cranmer
(74) *Attorney, Agent, or Firm*—Brooks Kushman P.C.

(57) ABSTRACT

An adjustable headrest assembly for a vehicle seat is disclosed. The assembly has a portion fixed to a seat frame and an adjustable portion that moves relative to the fixed portion on a circular arcuate path under spring forces. Relative movement is triggered by a vehicle rear crash event.

13 Claims, 7 Drawing Sheets

ADJUSTABLE HEADREST FOR A VEHICLE SEAT

CROSS-REFERENCE TO RELATED APPLICATIONS

This application is a non-provisional for U.S. provisional application Ser. No. 60/958,371, filed Jul. 5, 2007. Applicants claim the benefit of the priority of the provisional application.

BACKGROUND OF THE INVENTION

1. Field of the Invention

The invention relates to a vehicle seat headrest assembly with an adjustable portion for supporting the head of a seat occupant during a vehicle crash event.

2. Background Art

Contemporary automotive vehicles have driver and passenger vehicle seats facing in a forward vehicle travel direction. The vehicle seats each include a seat back portion and a seat cushion portion. A headrest assembly is situated at the upper margin of the seat back portion at a location directly adjacent the head of a vehicle occupant. In the event of a vehicle rear-end crash in which a forwardly directed high impact inertia force is created, a forwardly directed component of the inertia force will be distributed directly to passenger seat supporting structure, which is secured to the vehicle body and chassis. This forward component of the impact force is transferred through the vehicle body and chassis to the headrest assembly. The headrest assembly is intended to support the head of the seat occupant in order to prevent so-called whiplash injury caused by a crash event.

It is known design practice to provide a headrest adjustment mechanism for adjusting the headrest in a forward direction relative to the seat back during a vehicle rear-end crash event in order to prevent the head of a vehicle occupant from sudden rearward motion relative to the headrest assembly, thereby reducing the possibility of whiplash injury. Examples of adjustable headrests of this type may be seen by referring to U.S. Pat. Nos. 7,111,901 and 7,070,235.

Because of elasticity of the body and chassis structure and the seat frame, the inertia of the body and chassis structures and the elasticity of the seat frame and linkages between the seat frame and the adjustable headrest, a time delay exists between the instant a rear impact occurs during a vehicle crash and the instant the inertia forces are transmitted to the headrest assembly. For this reason, an adjustable feature of a headrest assembly of known design may be inadequate to protect a vehicle occupant from injury.

BRIEF DESCRIPTION OF EMBODIMENTS OF THE INVENTION

The disclosed embodiments of the invention comprise an adjustable assembly characterized by a minimal delay between an instant a rear crash event occurs and an instant when a headrest adjustment occurs. A first portion of the headrest assembly is secured to a seat back frame. First structural tubular members are secured to the fixed headrest portion. Second headrest tubular members are telescopically received in the first tubular members, although the assembly could be designed so that the first and second structural members are interchanged so that the first members would be received in the second. The movable portion of the headrest assembly is secured to the second tubular members in the disclosed embodiments. Thus, when the movable portion of the headrest assembly is moved in a forward direction, the tubular members will move in a telescopic fashion.

The telescoping members are shaped so that they form a portion of an arcuate path of travel. As an adjustment of the movable portion of the headrest occurs relative to the fixed portion, the path of travel of the movable portion relative to the fixed portion thus is an arc, thereby causing the movable portion of the headrest to travel arcuately forward as the movable headrest portion is moved toward the head of a seat occupant. The movable portion may carry a cushion to absorb kinetic energy created by the impact force of the crash.

One or more springs are located in the headrest assembly, one end of the springs being seated on the fixed portion of the headrest assembly and the other end being seated on the movable portion. A force of the spring is capable of moving the movable portion of the headrest assembly relative to the fixed portion. When the headrest assembly is in its pre-crash state, the springs are under compression, although tension springs could be adapted for use in the assembly. During a crash event, the force of the springs is released so that separation occurs between the movable portion and the fixed portion along the arcuate path defined by the telescoping members.

According to a first embodiment of the invention, the spring force release may be triggered by an impact sensor located on the vehicle, usually at the rear of the vehicle. When the rear of the vehicle is impacted during a crash, an electronic signal developed by the sensor will be delivered to a spring release actuator in the headrest assembly to trigger relative adjustment of the headrest assembly portions. The time lag between the impact and the release of the springs in Applicants' headrest assembly is substantially shorter than the time lag that exists in known adjustable headrest assemblies between the instant of an impact and the triggering of an adjustment of the adjustable portion of the headrest assembly. The triggering of the spring release is not delayed because of elasticity and inertia in the body and chassis structure and the seat back frame. Neither is it delayed by inertia and elasticity of a complex linkage mechanism in the vehicle seat back between the adjustable portion of the headrest assembly and the fixed portion of the headrest assembly, which is typical of known adjustable headrest designs.

According to a second embodiment of the invention, inertia-actuated locking elements are used to lock the movable headrest portion of the headrest assembly to the fixed portion. Inertia forces caused by a rear crash impact on the vehicle will adjust and release the locking element whereby the movable headrest portion will shift forward relative to the fixed portion under the force of springs. This occurs without the need for providing linkage elements to allow the movable headrest portion to adjust relative to the fixed portion.

The movable headrest portion is supported by an arcuate element that registers with an arcuate support element of the fixed headrest portion. As in the case of the first embodiment, the movable portion of the headrest is adjusted relative to the fixed portion, and the movable portion is displaced along a path of travel that defines an arc. The movable portion thus travels forward relative to the seat frame while simultaneously tilting forward relative to the fixed headrest portion.

PARTICULAR DESCRIPTION OF AN EMBODIMENT OF THE INVENTION

Figure 1:
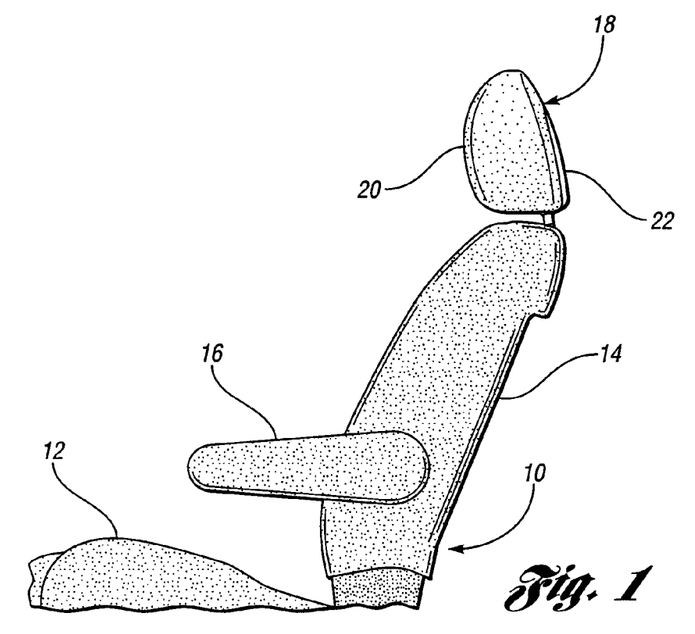
FIG. 1 is a side view of an automotive seat showing an adjustable headrest assembly mounted on a vehicle seat back.

In FIG. 1, an automotive passenger seat is generally indicated at 10. It includes a cushion portion 12 and a seat back portion 14. An adjustable armrest assembly 16 is pivoted on the seat back portion 14 between the position shown in FIG. 1 and a generally upright position adjacent one side of the seat back portion 14.

The headrest assembly of the disclosed embodiment of the invention is generally indicated at 18. The position of the headrest assembly 18, shown in FIG. 1, is the position it assumes prior to a vehicle crash event.

Figure 2:
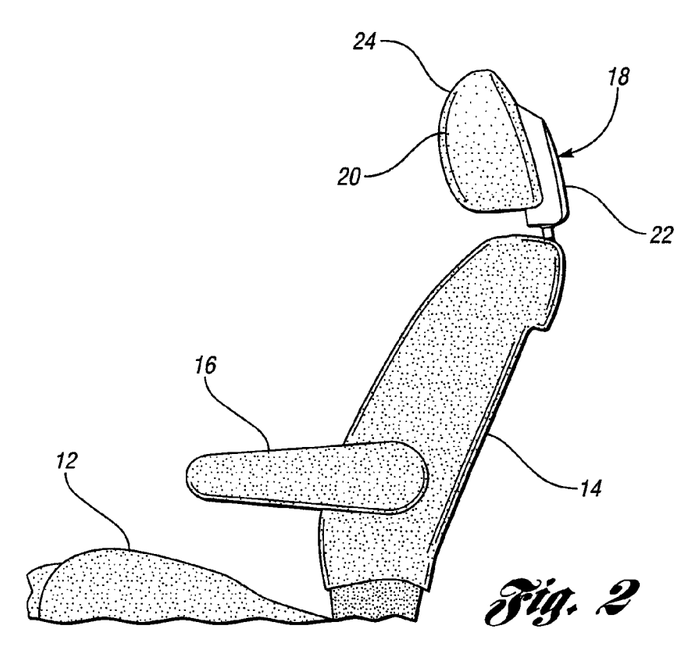
FIG. 2 is a view similar to FIG. 1 showing the adjustable headrest of an embodiment of the invention at a time subsequent to a vehicle crash event, wherein the adjustable portion of the headrest assembly is moved forwardly in an arcuate path relative to the fixed portion of the headrest assembly.

FIG. 2 is a view similar to the view of FIG. 1, but the position of the headrest assembly is changed relative to the position shown in FIG. 1. The position of the headrest assembly shown in FIG. 2 is the position that it assumes following a crash event. In FIG. 2, a forward portion of the headrest assembly, which is designated by numeral 20, is displaced relative to a rearward portion 22. The forward portion carries cushion material 24, which may be covered with vinyl typically used in contemporary vehicle seat constructions. As seen in FIG. 2, the forward portion 20 is moved in a forward direction, as well as in an upright tilted direction relative to the headrest portion 22.

Figure 3:
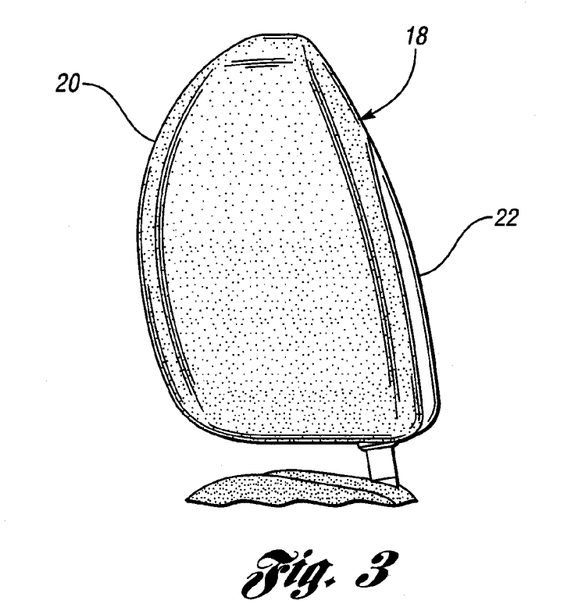
FIG. 3 is an enlarged view of the headrest assembly seen in FIG. 1.
Figure 4:
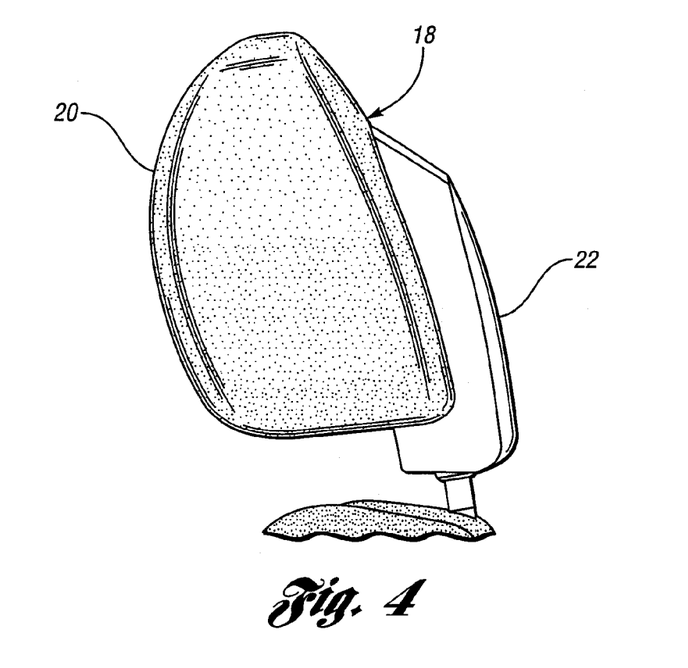
FIG. 4 is an enlarged view of the headrest assembly seen in FIG. 2 following a crash event.

FIG. 3 is an enlarged view of the headrest assembly seen in FIG. 1 before a crash event. FIG. 4 is an enlarged view of the headrest assembly shown in FIG. 2 following a crash event.

Figure 5:
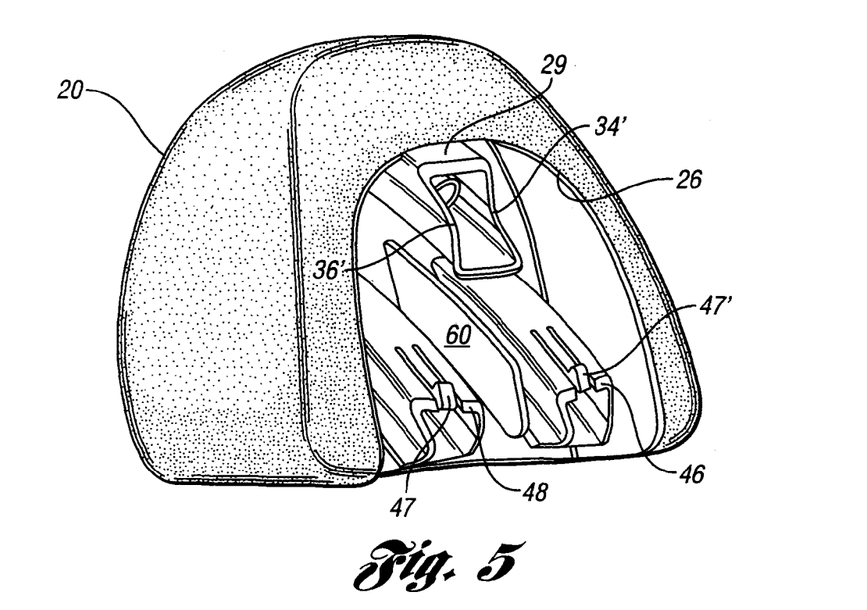
FIG. 5 is an enlarged view of the rear face of the adjustable portion of the headrest assembly seen in FIG. 1.

FIG. 5 is a rearward view of the forward adjustable portion 20 of an embodiment of the present invention. It illustrates generally structural elements of the forward portion of the headrest assembly situated within the interior of the forward portion 20. The forward portion 20 has an opening 26 through which the structural elements of the rearward portion are positioned.

Figure 6:
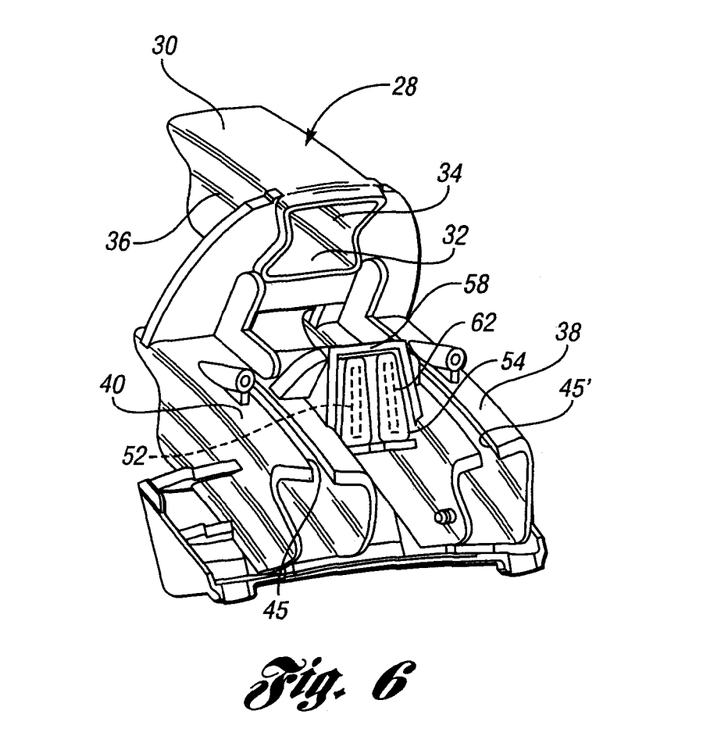
FIG. 6 shows a portion of the headrest assembly seen in FIG. 1, which is fixed to the seat back assembly.

FIG. 6 shows structural elements of the rearward portion of the headrest assembly. It includes a structural tubular element 28 comprising a top portion 30, a lower portion 32 and side portions 34 and 36. The side portions are depressed inwardly to accommodate springs that may be used to exert a force on the forward portion to separate the forward portion from the rearward portion when spring forces are triggered by a crash force. This will be explained with reference to FIGS. 14a and 14b. Tubular structures 38 and 40 support the forward portion and accommodate sliding movement of the forward portion relative to the rearward portion of the headrest assembly when the headrest portions are separated during a crash event.

Figure 7:
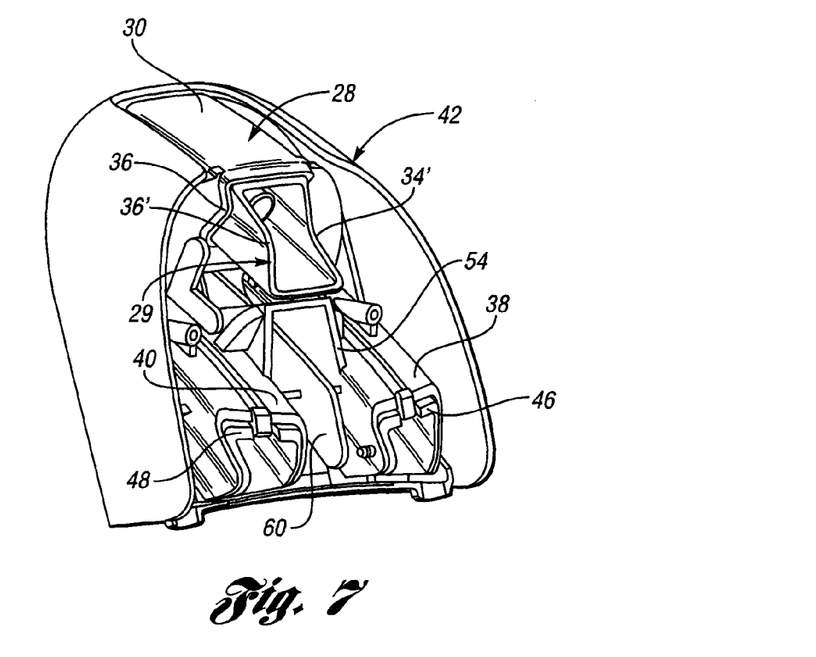
FIG. 7 is a view similar to FIG. 6, although a vinyl cover for cushion portions of the headrest assembly are added.
Figure 8:
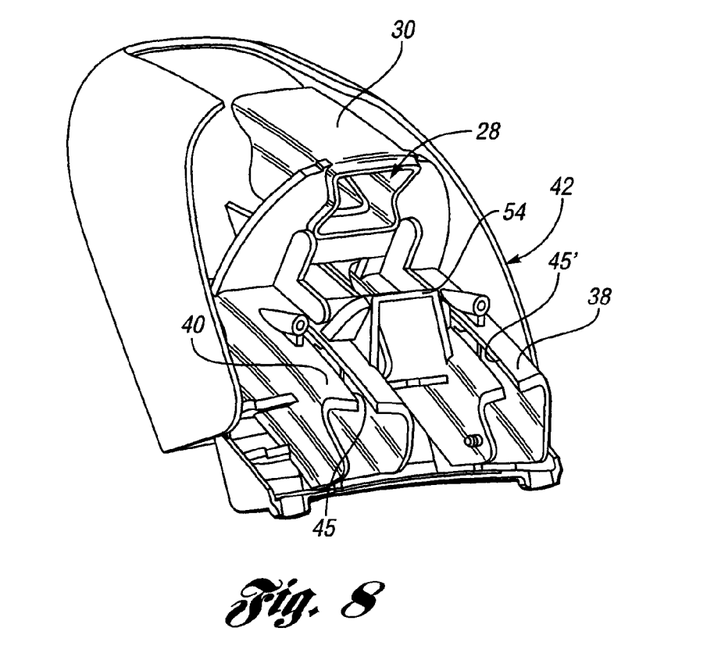
FIG. 8 is a view similar to FIG. 7 wherein the movable portion of the headrest assembly is shown adjusted in a forward direction following a crash event.

FIG. 7 shows the elements illustrated in FIG. 6, but FIG. 7 includes also an illustration of a vinyl covering 42 for the forward headrest assembly portion.

FIG. 7 also shows a portion of tubular members 46 and 48 that are telescopically received, respectively, in tubular members 38 and 40, which are part of the rearward headrest assembly. A tubular member is secured to the forward portion of the headrest assembly as indicated in FIG. 7 at 29. Like the tubular member 28, the tubular member 29 has side portions that extend inwardly, as shown at 34' and 36'.

Figure 9:
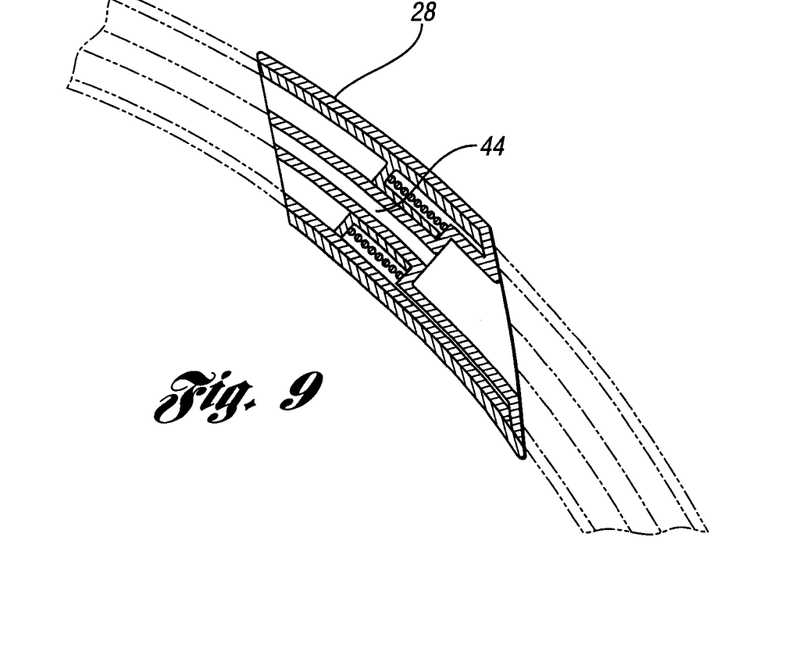
FIG. 9 is a schematic illustration of telescoping parts of the forward headrest portion and the rear headrest portion with the forward portion in a pre-crash position.
Figure 10:
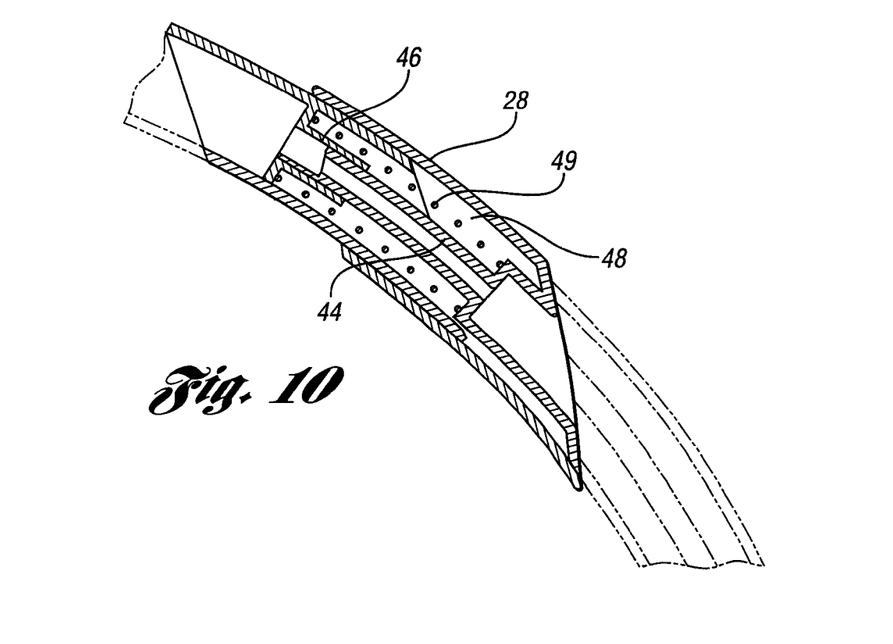
FIG. 10 is a schematic illustration of telescoping parts of the forward headrest portion and the rear headrest portion wherein the forward portion is adjusted to a post-crash position.

The tubular portion 28, which is secured to the rearward headrest portion of the headrest assembly, has a tubular extension 44, which is received in a tubular extension 46 of the tubular member 29 secured to the forward portion of the headrest assembly. This is seen in FIGS. 9 and 10.

Member 29 is provided with indented sides 34' and 36', which register with indented sides of the member 28. A coil compression spring 49 (FIG. 10) can be located in the space 48 surrounding the extension 46 and the member 44 to normally urge the portions of the headrest assembly to separate. The spring surrounding the extension 44 provides a force that complements the force of springs that may be provided in the cavities defined by the indented sides of the tubular members. Springs, not shown, may be provided in members 46 and 48 to provide a spring force to complement the force of spring 49 in space 48 and at the indented sides of the tubular members.

A latch 47 is carried by the end of a flexible, cantilevered arm formed on tubular member 46, as shown in FIG. 5. It is received in a longitudinal slot 45 in member 40, seen in FIG. 6. As the movable headrest portion moves to the position shown in FIG. 2, the latch moves within the slot 45. The length of the slot limits the travel of the movable headrest portion relative to the fixed headrest portion. A similar latch and slot is shown at 47' and 45' in FIGS. 5 and 6, respectively.

Figure 11:
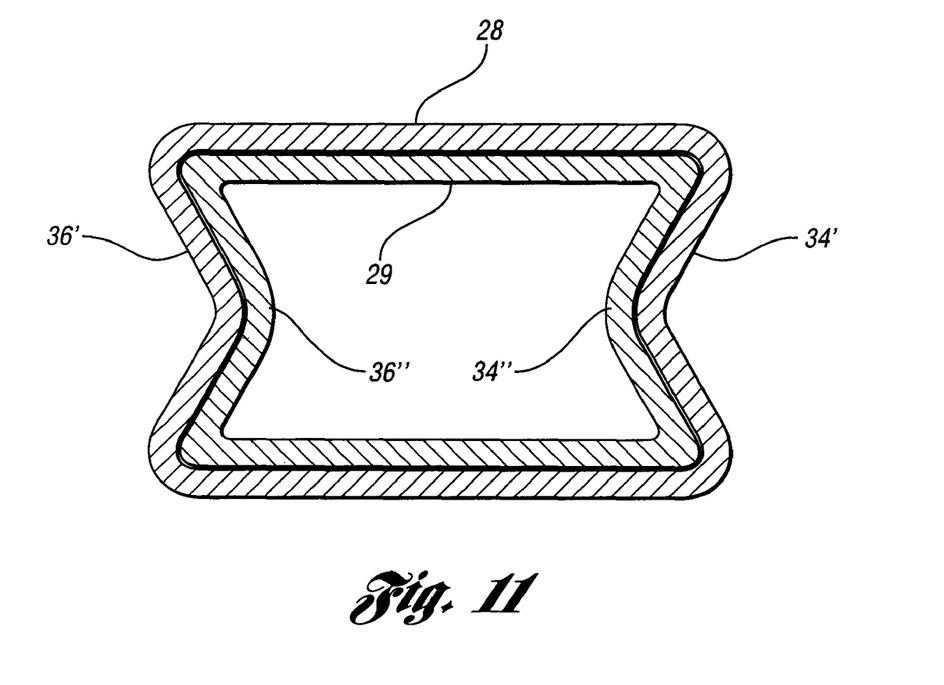
FIGS. 11 and 11a are cross-sectional views of alternate shapes of the telescoping members of the headrest assembly seen in FIGS. 5 and 6.
Figure 11A:
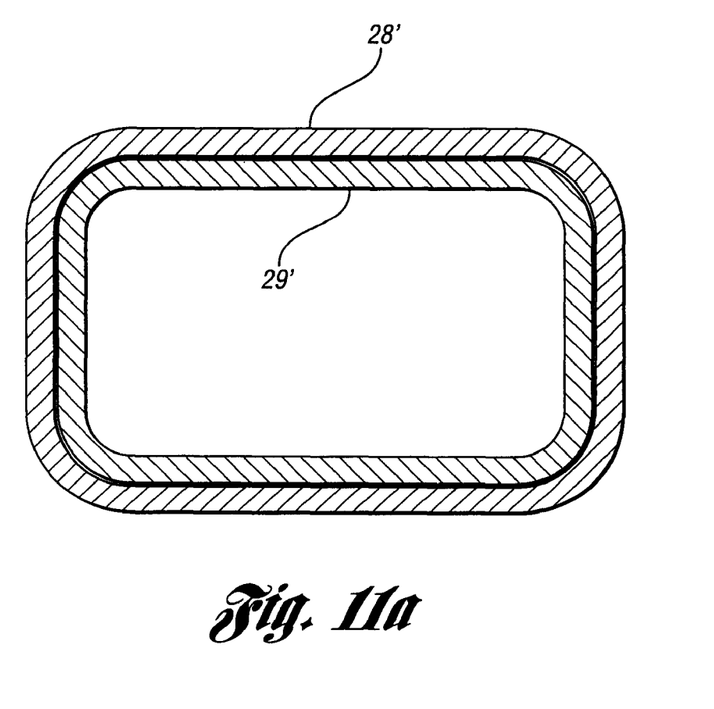

FIGS. 11 and 11a show typical cross-sections for the tubular members. In the case of FIG. 11, compression springs can be located in a space provided by the indented side portions 34" and 36"'. In the case of FIG. 11a, the cross-sectional shape of the tubular members may be generally rectangular, as shown at 28' and 29', if the spaces provided by indented side portions seen in FIG. 11 are not required for accommodating compression springs.

Figure 12:
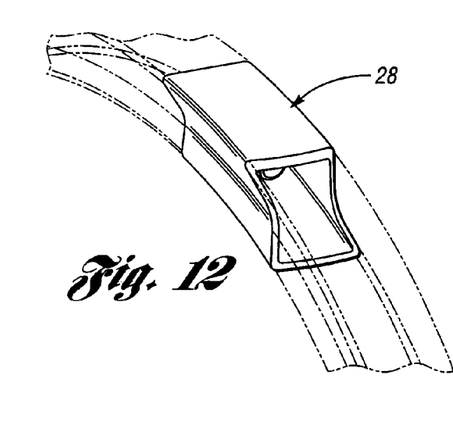
FIGS. 12 and 13 illustrate circular arcs that are defined by the telescoping members of the headrest assembly.
Figure 13:
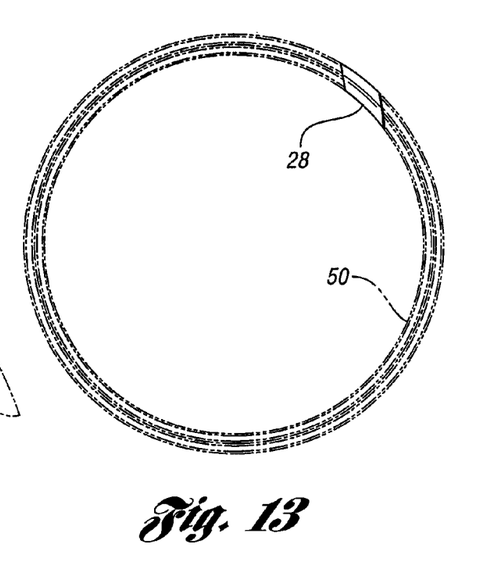

FIGS. 12 and 13 generally illustrate the arcuate geometry of the tubular members. The tubular members form a segment of a circle, shown at 50 in FIG. 13.

Figure 14A:
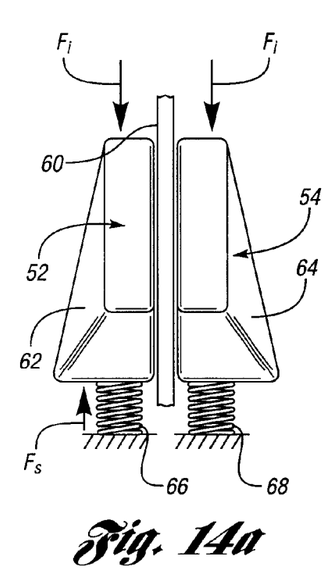
FIGS. 14a and 14b show top plan views of alternate embodiments of the invention wherein locking inertia wedges are located between walls that form a part of fixed portions of the headrest

According to one embodiment of the invention, two inertia wedges, seen in FIGS. 6 and in FIG. 14a at 52 and 54, are received in enclosure 58, which may form an integral part of the fixed headrest portion. A plate 60, which is fixed to the adjustable headrest portion 20, is disposed between adjacent planar sides of the wedges. The opposite sides 62 and 64 are sloped in a generally tangential direction relative to the circle 50 seen in FIG. 13 to define wedge surfaces. These wedge surfaces are disposed fore-and-aft directly adjacent sloped surfaces of the enclosure 58.

Springs 66 and 68 may be used to normally bias the wedges 52 and 54 into frictional locking engagement with plate 60 as the sloped sides engage the enclosure 58 (FIG. 6). The wedges thus normally frictionally lock the plate 60 and the movable portion of the headrest assembly to the fixed portion of the headrest assembly before a crash event. If desired, the mass of each wedge can be increased by placing a heavy core, seen at 62 in FIG. 6, into or on the wedges to increase the static inertia of the wedges.

When a crash event occurs, the static inertia force Fi of the wedges will cause the wedges to be displaced from contact with the plate 60, thereby triggering release of spring forces $F_s$ on the movable headrest portion. The movable headrest portion thus moves forwardly relative to fixed headrest portion along the path of movement defined by the circular arc segment of the telescoped tubular members seen in FIGS. 12 and 13.

Figure 14B:
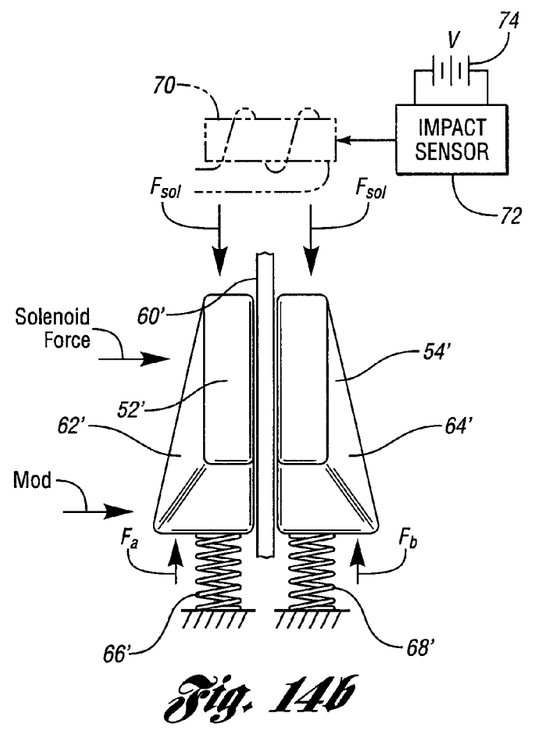

In an alternate embodiment of the invention shown in FIG. 14b, the wedges 52 and 54 with wedge surfaces 62' and 64' are activated by a solenoid actuator 70. An impact sensor 72, which may be mounted on or near a rear bumper of a vehicle, will send a voltage signal from source 74 to actuator 70, which creates a solenoid force that overcome spring forces $F_s$. The actuator forces of actuator 70 are shown at $F_{SOL}$. Prime notations are used on numerals in FIG. 14b corresponding to numerals in FIG. 14a.

Although embodiments of the invention are disclosed, it will be apparent to a skilled artisan that modifications may be made without departing from the scope of the invention. All such modifications and equivalents thereof are within the scope of the following claims.

What is claimed is:

1. An adjustable headrest assembly for a vehicle seat having a seat cushion portion and a seat back portion, the headrest assembly comprising:
    a fixed headrest portion secured to the seat back portion;
    a movable headrest portion mounted on the fixed headrest portion at a location adjacent the head of a vehicle occupant;
    the mounting for the movable headrest portion comprising arcuate, telescoping members, one telescoping member forming a part of the movable headrest portion and the other telescoping member forming a part of the fixed headrest portion;
    at least one spring between the movable and fixed headrest portions for applying a spring force for adjusting the movable headrest portion in a forward direction relative to the fixed headrest portion;
    at least one releasable locking element securing the movable headrest portions together against a biasing spring force; and
    the locking element being released in response to an inertia-force of a vehicle rear impact.

2. The headrest assembly set forth in claim 1 wherein multiple pairs of telescoping members define a mount for the movable headrest portion;
    the spring being disposed between telescoping members of at least one pair of telescoping members.

3. The headrest assembly set forth in claim 2 wherein the telescoping members are disposed in a circular arc arranged fore-and-aft relative to a vehicle driving direction.

4. The headrest assembly set forth in claim 2 wherein the telescoping members are tubular, the spring being disposed within the at least one pair of telescoping members.

5. The headrest assembly set forth in claim 2 wherein the telescoping members of each pair enclose a spring normally biasing the telescoping members apart.

6. The headrest assembly set forth in claim 2 wherein a telescoping member of at least one pair of telescoping member carries a latch engagable with the other telescoping member of the one pair thereby limiting arcuate, movement of the movable headrest portion relative to the fixed headrest portion.

7. The headrest assembly set forth in claim 1 wherein the at least one locking element is of sufficient mass to establish sufficient static inertia that effects release of the locking element in response to impact force of a vehicle rear crash event.

8. The headrest assembly set forth in claim 1 wherein the telescoping members are disposed in a circular arc arranged fore-and-aft relative to a vehicle driving direction.

9. An adjustable headrest assembly for a vehicle having a vehicle seat with a seat cushion portion and a seat back portion; the headrest assembly comprising:
    a fixed headrest portion secured to the seat back portion;
    a movable headrest portion mounted on the fixed headrest portion at a location adjacent the head of a vehicle occupant;
    the mounting for the movable headrest portion comprising arcuate, telescoping members, one telescoping member forming a part of the movable headrest portion and the other telescoping member forming a part of the fixed headrest portion;
    at least one spring between the movable and fixed headrest portion for applying a spring force for adjusting the movable headrest portion in a forward direction relative to the fixed headrest portion;
    at least one releasable locking element securing the movable headrest portions together against a biasing spring force;
    an inertia impact sensor located at the rear of the vehicle; and
    an electric actuator electrically connected to the sensor and forming a part of the headrest assembly for releasing the locking elements to trigger relative sliding movement of the telescoping members at the instant of a vehicle crash event.

10. The headrest assembly set forth in claim 9 wherein the telescoping members are disposed in an arc arranged fore-and-aft relative to a vehicle driving direction.

11. The headrest assembly set forth in claim 10 wherein the telescoping members are tubular, the at least one spring being disposed within the one pair of telescoping members.

12. An adjustable headrest assembly for a vehicle seat having a seat cushion portion and a seat back portion, the headrest assembly comprising:
    a fixed headrest portion secured to the seat back portion;
    a movable headrest portion mounted on the fixed headrest portion at a location adjacent the head of a vehicle occupant;
    the mounting for the movable headrest portion comprising arcuate, telescoping members, one telescoping member forming a part of the movable headrest portion and the other telescoping member forming a part of the fixed headrest portion;
    at least one spring between the movable and fixed headrest portions for applying a spring force for adjusting the movable headrest portion in a forward direction relative to the fixed headrest portion;
    at least one releasable locking element securing the movable headrest portions together against a biasing spring force;
    the locking element being released in response to an inertia-force of a vehicle rear impact;

wherein multiple pairs of telescoping members define a mount for the movable headrest portion;

the spring being disposed between telescoping of at least one pair of telescoping members;

wherein the fixed headrest portion has at least one friction surface, the at least one locking element being carried by the fixed headrest portion and having a cam surface engagable with the friction surface under a biasing force of a locking element spring; and a plate disposed adjacent the at least one locking element, the plate being secured to the movable portion of the headrest assembly and locked to the at least one locking element under the force of the locking element spring.

13. The headrest assembly set forth in claim 12 wherein two locking elements are carried by the fixed portion of the headrest assembly, the plate being disposed between the locking elements.

* * * * *